(12) United States Patent
Miura

(10) Patent No.: US 12,248,540 B2
(45) Date of Patent: Mar. 11, 2025

(54) INFORMATION PROCESSING DEVICE, SYSTEM, AND METHOD FOR LICENSE VERIFICATION

(71) Applicant: Konica Minolta, Inc., Tokyo (JP)

(72) Inventor: Megumi Miura, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 243 days.

(21) Appl. No.: 17/710,299

(22) Filed: Mar. 31, 2022

(65) Prior Publication Data

US 2022/0318341 A1    Oct. 6, 2022

(30) Foreign Application Priority Data

Apr. 5, 2021    (JP) .................................. 2021-064012

(51) Int. Cl.
*G06F 21/00*    (2013.01)
*G06F 21/10*    (2013.01)
*G06F 21/12*    (2013.01)

(52) U.S. Cl.
CPC .............. *G06F 21/12* (2013.01); *G06F 21/10* (2013.01)

(58) Field of Classification Search
CPC ........ G06F 21/10; G06F 21/12; G06F 21/105; G06F 21/107
See application file for complete search history.

(56) References Cited

U.S. PATENT DOCUMENTS

| 2008/0289009 A1* | 11/2008 | Lee ..................... H04L 63/0227 726/4 |
| 2018/0314809 A1* | 11/2018 | Mintz ................... G06F 21/105 |
| 2020/0285716 A1* | 9/2020 | Punathil ................ G06F 16/243 |

FOREIGN PATENT DOCUMENTS

| JP | 2014-6830 A | 1/2014 |
| JP | 2019012434 A | 1/2019 |

OTHER PUBLICATIONS

Japanese Office Action (JPOA) dated Feb. 20, 2024 for Japanese Patent Application No. 2021-064012; English translation.

\* cited by examiner

*Primary Examiner* — Joseph P Hirl
*Assistant Examiner* — Chi D Nguy
(74) *Attorney, Agent, or Firm* — RANKIN, HILL & CLARK LLP

(57) ABSTRACT

An information processing device includes: a hardware processor that executes a license check of software, wherein the hardware processor detects a request for remote access to the software, extracts a description about remote access from a license agreement of the software to which a request for remote access is requesting access, and determines, based on the extracted description about the remote access, whether the remote access is a license violation.

20 Claims, 9 Drawing Sheets

FIG. 7

| STATE | RESULTS | |
|---|---|---|
| ORIGINAL TEXT | FOR REMOTE ACCESS. THE USER MAY ACCESS AND USE THE SOFTWARE INSTALLED IN THE LICENSED DEVICE FROM ANOTHER DEVICE USING REMOTE ACCESS. HOWEVER, THE ACCESS IS AVAILABLE IF THE SOFTWARE INSTALLED IN THE LICENSED DEVICE IS NOT CONCURRENTLY BEING USED BY ANOTHER USER.<br>OTHER USERS MAY USE REMOTE ACCESS TO ACCESS THE LICENSED DEVICE FROM ANOTHER DEVICE AT ANY TIME, BUT ONLY WHEN USING A DEVICE THAT EXECUTES A VERSION EQUAL TO OR HIGHER THAN THAT OF THE SOFTWARE. | 710 |
| DESCRIBED IN A SINGLE SENTENCE | ['FOR REMOTE ACCESS,<br>'THE USER MAY ACCESS AND USE THE SOFTWARE INSTALLED IN THE LICENSED DEVICE FROM ANOTHER DEVICE USING REMOTE ACCESS',<br>'HOWEVER, THE ACCESS IS AVAILABLE IF THE SOFTWARE INSTALLED IN THE LICENSED DEVICE IS NOT CONCURRENTLY BEING USED BY ANOTHER USER',<br>'OTHER USERS MAY USE REMOTE ACCESS TO ACCESS THE LICENSED DEVICE FROM ANOTHER DEVICE AT ANY TIME, BUT ONLY WHEN USING A DEVICE THAT EXECUTES A VERSION EQUAL TO OR HIGHER THAN THAT OF THE SOFTWARE'] | 720 |
| MORPHOLOGICAL ANALYSIS (WORD DIVISION) | [['REMOTE ACCESS', 'ABOUT'],<br>['USER', 'SOFTWARE', 'INSTALLED',<br>'IN', 'LICENSED', 'DEVICE', (OMITTED)]] | 730 |

FIG. 8

| SENTENCE PATTERN | USE CONDITION |
|---|---|
| ['REMOTE ACCESS IS PERMITTED', 'SOFTWARE IS AVAILABLE BY REMOTE ACCESS', 'ALSO AVAILABLE BY REMOTE CONNECTION'] | REMOTE ACCESS PERMITTED |
| ['REMOTE ACCESS IS NOT PERMITTED', 'SOFTWARE IS NOT AVAILABLE BY REMOTE ACCESS', 'NOT AVAILABLE BY REMOTE CONNECTION'] | REMOTE ACCESS NOT PERMITTED |
| ['SIMULTANEOUS CONNECTION WITH TWO OR MORE DEVICES NOT PERMITTED', 'REMOTE CONNECTION WITH TWO OR MORE DEVICES NOT PERMITTED', 'ONLY USE OF ONE DEVICE'] | SIMULTANEOUS CONNECTION NOT PERMITTED |
| ['AVAILABLE IN THE SAME SITE', 'THERE IS NO PROBLEM IN USE IN THE SAME SITE'] | AVAILABLE IN THE SAME SITE |

FIG. 9

| USE CONDITION | SENTENCE PATTERN | VECTOR VALUE |
|---|---|---|
| REMOTE ACCESS PERMITTED | REMOTE ACCESS IS PERMITTED | [0.579 0.869 0.859 0.898] |
| | SOFTWARE IS AVAILABLE BY REMOTE ACCESS | [1.312 0.193 0.083 0.134] |
| | ALSO AVAILABLE BY REMOTE CONNECTION | [0.321 1.244 1.262 1.093] |
| REMOTE ACCESS NOT PERMITTED | REMOTE ACCESS IS NOT PERMITTED | [0.251 −0.563 0.145 −0.421] |
| | SOFTWARE IS NOT AVAILABLE BY REMOTE ACCESS | [0.392 1.048 1.583 −0.382] |
| | NOT AVAILABLE BY REMOTE CONNECTION | [0.853 1.048 1.123 0.012] |
| SIMULTANEOUS CONNECTION NOT PERMITTED | SIMULTANEOUS CONNECTION WITH TWO OR MORE DEVICES IS NOT PERMITTED | [ −1.384 −1.483 0.275 0.271] |
| ⋮ | ⋮ | ⋮ |

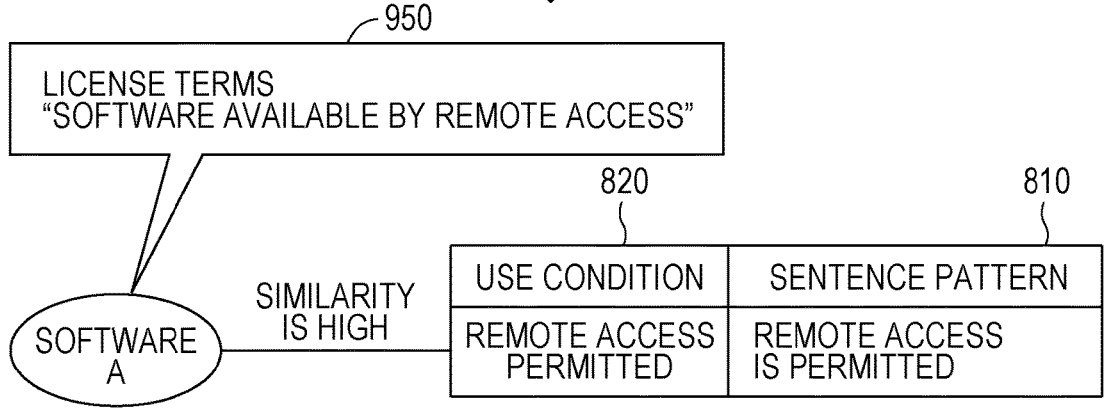

| USE CONDITION | CRITERION FOR DETERMINING A LICENSE VIOLATION |
|---|---|
| REMOTE ACCESS PERMITTED | None |
| REMOTE ACCESS NOT PERMITTED | RemoteAccess |
| SIMULTANEOUS CONNECTION NOT PERMITTED | RemoteAccess NumConnection |
| AVAILABLE IN THE SAME SITE | Device.InstallationLocation |

INFORMATION PROCESSING DEVICE, SYSTEM, AND METHOD FOR LICENSE VERIFICATION

The entire disclosure of Japanese patent Application No. 2021-064012, filed on Apr. 5, 2021, is incorporated herein by reference in its entirety.

BACKGROUND

Technological Field

The present disclosure relates to an information processing device, and more specifically, to a license verification technique for remote access.

Description of the Related Art

For a vendor that provides software, appropriately protecting software that is an asset is an important. The vendor generally sets a certain restriction on the use of the software by the user by setting the terms of use of the software. Furthermore, in recent years, use of software by remote access has increased. Using the remote access technology, a user can use a device at hand to use data, software, or the like stored by another device at a remote location.

However, although there is software with a license agreement for remote access, there is no system for detecting license violation related to remote access. Therefore, in order to prevent license violation related to remote access, a vendor is required to implement a function in software of detecting license violation related to remote access.

Regarding remote access, for example, JP 2014 006830 A discloses a computer system in which "for a server operated by a remote console, an audit program is incorporated in a remote console agent module of the server, whether an operation on the server violates a working condition input by a customer in advance is monitored, and when the violation occurs, a network function of the server is disconnected and the monitoring information is recorded as an audit log, thereby preventing leakage of information due to unauthorized access" (see [Abstract]).

According to the technology disclosed in JP 2014-006830 A, it is not possible to detect license violation related to remote access. Therefore, there is a need for a technology for detecting license violation related to remote access.

SUMMARY

The present disclosure has been made in view of the above background, and an object in an aspect is to provide a technology for detecting a license violation related to remote access.

To achieve the abovementioned object, according to an aspect of the present invention, an information processing device reflecting one aspect of the present invention comprises: a hardware processor that executes a license check of software, wherein the hardware processor detects a request for remote access to the software, extracts a description about remote access from a license agreement of the software to which a request for remote access is requesting access, and determines, based on the extracted description about the remote access, whether the remote access is a license violation.

BRIEF DESCRIPTION OF THE DRAWINGS

The objects, aspects, advantages and features provided by one or more embodiments of the invention will become more fully understood from the detailed description given hereinbelow and the appended drawings which are given by way of illustration only, and thus are not intended as a definition of the limits of the present invention:

FIG. 7 is a diagram illustrating an example of process of describing part of a description of a license agreement in a single sentence;

FIG. 8 is a diagram illustrating an example of link information between a sentence pattern of license terms of remote access and a use condition regarding remote access;

FIG. 9 is a diagram illustrating an example of process of calculating similarity between a description about remote access and a sentence pattern prepared in advance;

DETAILED DESCRIPTION OF EMBODIMENTS

Figure 1:
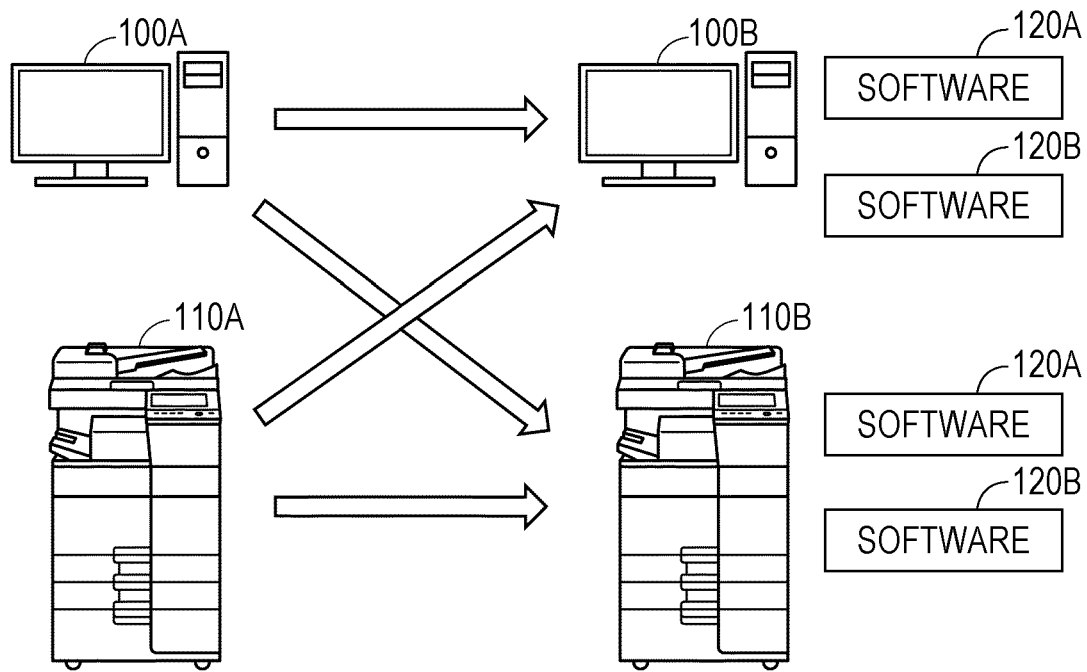
FIG. 1 is a diagram illustrating an application example of a license violation detection technology regarding remote access according to an embodiment.

Hereinafter, one or more embodiments of the present invention will be described with reference to the drawings. However, the scope of the invention is not limited to the disclosed embodiments. In the following description, the same components are denoted by the same reference numerals. Their names and functions are the same. Therefore, detailed descriptions thereof will not be repeated. Note that, in the following description, when referring to a plurality of the same configurations, they may be expressed as configurations 123A and 123B. In addition, when they are collectively referred to, they are expressed as a configuration 123.

A. Application Example

FIG. 1 is a diagram illustrating an application example of a license violation detection technology regarding remote access according to the present embodiment. A device 100 is a personal computer (PC), a tablet, a smartphone, or any other information processing devices. A device 110 is any office equipment such as a multifunction peripheral (MFP).

The device 100A, the device 100B, the device 110A, and the device 110B are all connected to a network and can communicate with each other. In addition, each device can use software installed in another device by remote access. For example, the device 100A may remotely access the device 100B or software installed in the device 110B. In addition, the device 110A can remotely access the device 100B or software installed in the device 110B.

In an aspect, the network may be a local area network (LAN). In another aspect, the devices may be connected to each other by a wired network, a wireless network, or a combination thereof.

As an example, it is assumed that the software 120A and 120B is installed in the devices 100B and 110B, respectively. In addition, it is assumed that the license agreement of the software 120A permits remote access and the license agreement of the software 120B do not permit remote access. In this case, when receiving a request for remote access to the software 120A from the device 100A or the device 110A, the device 100B or the device 110B should permit the request. On the other hand, when receiving a request for remote access to the software 120B from the device 100A or the device 110A, the device 100B or the device 110B desirably rejects the request.

However, the conventional software or device does not have a function of detecting a license violation related to remote access, and it is not possible to determine whether the received request for remote access corresponds to the license violation related to remote access. Therefore, there is a need for a technique for determining, based on software license agreement, whether remote access to certain software is a license violation.

Therefore, in the technology for detecting a license violation related to remote access according to the present embodiment, a license check unit capable of detecting a license violation for one or a plurality of pieces of software is installed in each device. For example, the license check unit installed in the device 100B extracts a description about remote access to the software 120A from the license agreement of the software 120A based on there being a request for remote access to the software 120A. In an aspect, the device 100B in which the software 120A is installed may store a license agreement of the software 120A. In another aspect, an external server or the like may store a license agreement of the software 120A. In this case, the device 100B in which the software 120A is installed may request the license agreement of the software 120A from the external server.

Next, the license check unit converts the description about remote access extracted from the license agreement into a single sentence or a set of single sentences by using a morphological analysis or the like. Furthermore, the license check unit calculates similarity between the single sentence or the set of single sentences and the sentence pattern related to remote access prepared in advance. In addition, the license check unit classifies the license content of the remote access to the software 120A based on the calculated similarity. Then, the license check unit can determine whether the remote access to the software 120A is a license violation based on the classified license contents and the information about the current remote access (presence or absence of remote access, the number of remote accesses, location information, and the like).

In an aspect, the external server may have a function of detecting a license violation. In this case, the license check unit is installed in the external server, and each device 100, 110 is only required to have a function (software) of communicating with the license check unit.

The technology for detecting a license violation related to remote access according to the present embodiment can determine whether remote access to certain software is a license violation by using the above-described license check unit.

Furthermore, the license check unit may be independent of software that receives the request for remote access. Therefore, even when a plurality of pieces of software is installed in the device 100, 110, the license check unit can detect a license violation related to remote access based on the license agreement of each of the plurality of pieces of software without requiring modification for each piece of software.

B. Functional and Hardware Configuration

Figure 2:
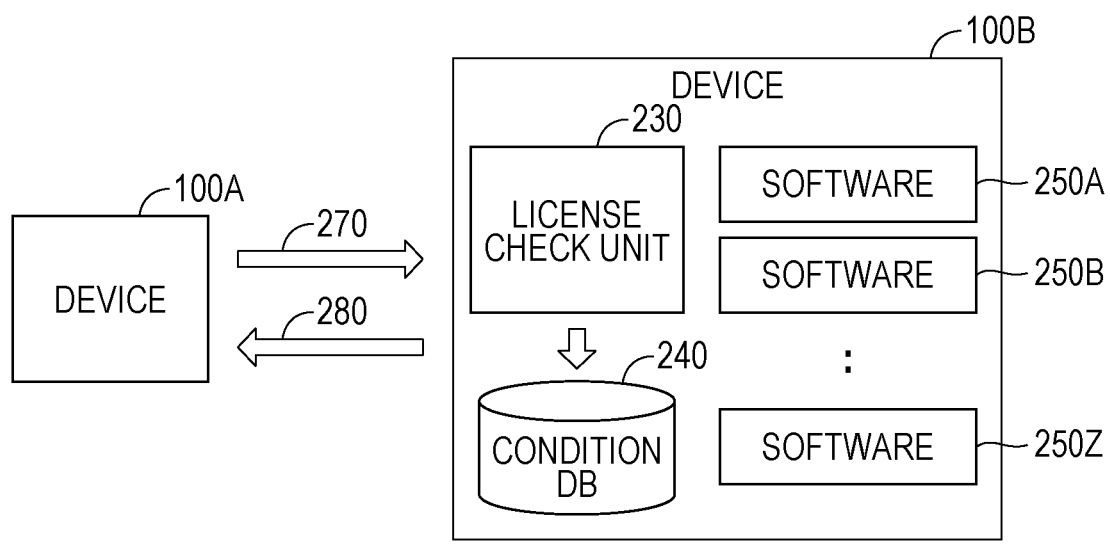
FIG. 2 is a diagram illustrating an example of an operation of a license check unit that detects a license violation related to remote access.

FIG. 2 is a diagram illustrating an example of an operation of a license check unit 230 that detects a license violation related to remote access. With reference to FIG. 2, the operation of the license check unit 230 will be described using a procedure, as an example, in which the device 100A remotely accesses software installed in the device 100B. In an aspect, the device 100A may be the device 110A, and the device 100B may be the device 110B.

The device 100A transmits, to the device 100B, a request for remote access 270 to software 250A. The license check unit 230 refers to a condition database (DB) 240 based on detecting the request for remote access 270. Then, the license check unit 230 determines whether the remote access to the software 250A from the device 100A is a license violation based on various types of information stored in a condition DB240. As an example, the condition DB240 stores a license agreement of each software 250, sentence patterns of license terms of remote access, use conditions regarding remote access, and a criterion for determining a license violation in each of the use conditions.

The license agreement is prepared in each software 250, and may be text data. The license agreement may include, as part thereof, license terms about remote access.

The sentence pattern of the license terms of remote access is a sentence pattern prepared in advance, and may be excerpt data of license terms about existing remote access. In an aspect, the sentence pattern of the license terms of remote access may include a sentence obtained by extracting only part of the existing license terms about remote access or a sentence similar thereto.

The use condition related to remote access may include, for example, any use condition such as "remote access permitted", "remote access not permitted", "simultaneous connection not permitted (remote access permitted for up to one device)", "up to N devices are permitted to be connected simultaneously", and "available only in the same site".

Examples of a criterion for determining a license violation may include "presence or absence of current remote access", "the number of remote accesses", "information about locations of a device sending a request for remote access 270 and a device in which the software 250 is installed", and the like. In an aspect, the information about a location of the device may be a physical location, an internet protocol (IP) address, a domain, or the like. Note that each of the plurality of sentence patterns and each of the plurality of use conditions are linked with each other. In addition, each of the plurality of use conditions and each of the plurality of criteria for determining a license violation are linked with each other.

Hereinafter, a procedure in which the license check unit 230 detects a license violation with reference to the condition DB240 will be described. First, the license check unit 230 decomposes the license agreement of the software 250A, to which the request for remote access 270 is requesting access, into a single sentence or a set of single sentences using a morphological analysis algorithm or the like, and vectorizes the single sentence or the set of single sentences (obtains a vector value). Secondly, the license check unit 230 compares the single sentence or the set of single sentences of the license agreement with the sentence pattern of the license terms of remote access based on the vector value, and searches for a sentence pattern with high similarity.

Third, the license check unit 230 selects the use condition linked with the sentence pattern having the highest similarity. Fourth, the license check unit 230 selects a criterion for determining a license violation linked with the selected use condition.

Fifth, the license check unit 230 determines, based on the selected criterion for determining a license violation, whether the remote access to the software 250A from the device 100A is a license violation. In an aspect, the license check unit 230 may acquire any information (hardware information, position information, user information, and the like) related to the device 100A from the device 100A, and use part of the information as a criterion for determining a license violation.

As an example, it is assumed that the license agreement of the software 250A correspond to "simultaneous connection not permitted (remote access permitted for up to one device)". In this case, when only the device 100A requests remote access to the software 250A, the number of remote accesses to the software 250A is 1. Therefore, the remote access to the software 250A from the device 100A does not violate the license agreement, "simultaneous connection not permitted (remote access permitted for up to one device)". Therefore, the license check unit 230 determines that the remote access to the software 250A from the device 100A is not a license violation. In a case where it is determined that there is no license violation, the license check unit 230 permits the device 100A to perform remote access.

On the other hand, it is assumed that the device 100A transmits the request for remote access 270 to the software 250A while another device 100C is already remotely accessing the software 250A. In this case, the number of remote accesses to the software 250A is 2. Therefore, the remote access to the software 250A from the device 100A violates the license agreement, "simultaneous connection not permitted (remote access permitted for up to one device)". Therefore, the license check unit 230 determines that the remote access to the software 250A from the device 100A is a license violation. In a case where it is determined that there is a license violation, the license check unit 230 transmits a notification 280 of the license violation to the device 100A. In an aspect, in a case where the license check unit 230 determines that there is a license violation, communication from the device 100A may be blocked. In another aspect, in a case where it is determined that there is a license violation, the license check unit 230 may generate a communication log from the device 100A.

Figure 3:
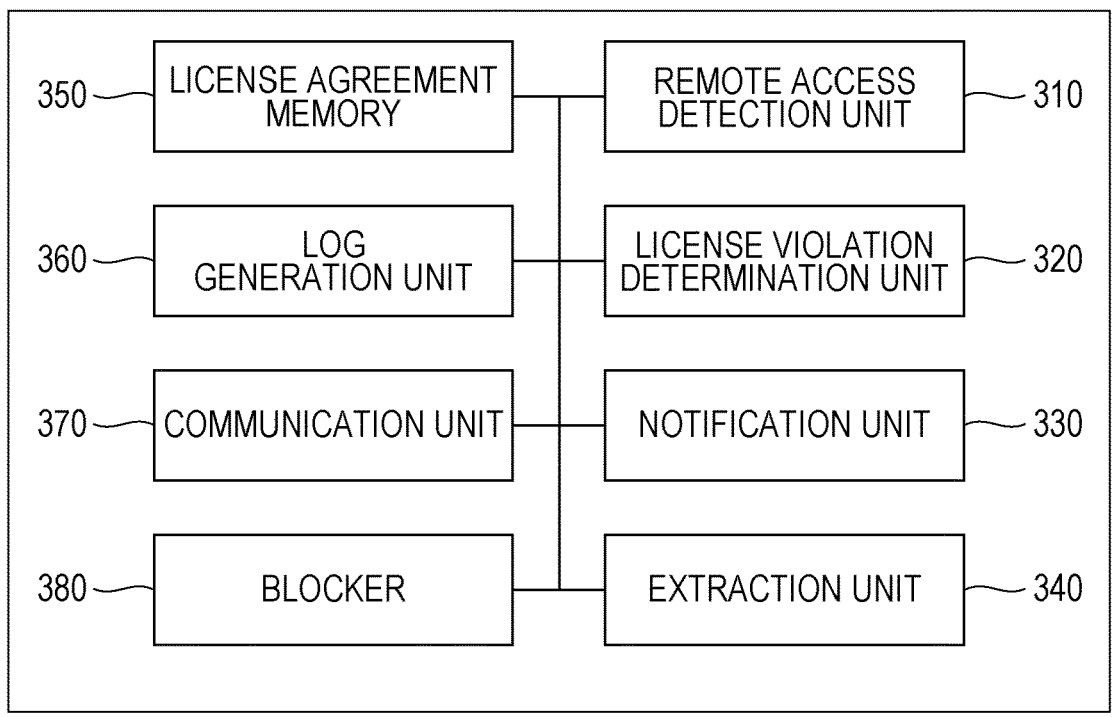
FIG. 3 is a block diagram illustrating an example of a configuration of functions implemented by the license check unit.

FIG. 3 is a block diagram illustrating an example of a configuration of functions implemented by the license check unit 230. The configuration of the license check unit 230 will be described with reference to FIG. 3. In an aspect, the license check unit 230 and other configurations illustrated in FIG. 3 can be implemented by software. In this case, each configuration illustrated in FIG. 3 can be implemented on the hardware illustrated in FIG. 4. The license check unit 230 includes a remote access detection unit 310, a license violation determination unit 320, a notification unit 330, an extraction unit 340, a license agreement memory 350, a log generation unit 360, a communication unit 370, and a blocker 380.

The remote access detection unit 310 detects connection by remote access from an external device or a request for remote access. In an aspect, the remote access detection unit 310 can determine, based on the number of the port which has received the request for remote access or the data included in the request for remote access, to which software the detected request for remote access is requesting access.

The license violation determination unit 320 determines whether the detected remote access is a license violation based on the information extracted by the extraction unit 340. The license violation determination unit 320 can determine whether the requested remote access is a license violation based on the procedure described with reference to FIG. 2.

The notification unit 330 transmits the notification related to the license violation to the device that has transmitted the request for remote access. The notification unit 330 can output the notification based on the fact that the license violation determination unit 320 determines that the requested remote access is a license violation. In an aspect, the notification unit 330 may output a notification indicating that there is no license violation.

The extraction unit 340 extracts a description about remote access from the license agreement stored in the license agreement memory 350. As an example, in a case where the remote access detection unit 310 detects a request for remote access to the software 120A, the extraction unit 340 analyzes the license agreement of the software 120A and extracts a description about the request for remote access.

The license agreement memory 350 stores the license agreement of each software installed in the device. In an aspect, when the license agreement memory 350 stores the license agreement, the condition DB240 may not store the license agreement. In another aspect, in a case where the condition DB240 stores the license agreement, the license check unit 230 may not include the license agreement memory 350. In another aspect, the license agreement may be stored in an external server. In this case, the license check unit 230 may include a license agreement request unit (not illustrated) that requests a license agreement from the external server.

The log generation unit 360 generates a log related to license violation and stores the log in the device in which the license check unit 230 is installed. As an example, in a case where the remote access detection unit 310 detects a request for remote access to the software 120A, the extraction unit 340 can generate a log of remote access to the software 120A. In an aspect, the log generation unit 360 may generate a communication log even when there is no license violation.

The communication unit 370 transmits and receives any information to and from an external server in cooperation with the external server. In an aspect, the communication unit 370 may receive the license agreement of each software from an external server. In another aspect, the communication unit 370 may acquire all the information included in the condition DB240 from an external server. The blocker 380 blocks remote access communication based on occurrence of the license violation. In an aspect, the communication unit 370 may include the function of the blocker 380.

Figure 4:
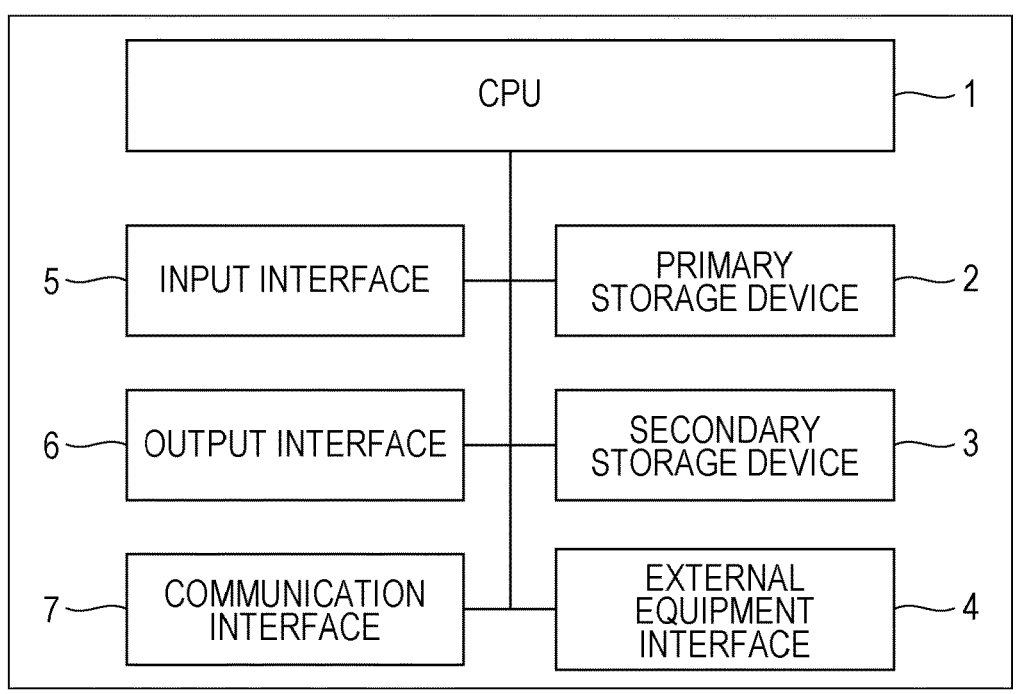
FIG. 4 is a diagram illustrating an example of a hardware configuration of a device in which the license check unit realized as software is installed.

FIG. 4 is a diagram illustrating an example of a hardware configuration of a device 400 in which the license check unit 230 realized as software is installed. In an aspect, the device 400 may be used as the device 100 or may be incorporated into the device 110, which is office equipment. In another aspect, the device 400 may execute the processing described with reference to FIG. 2 as a program on the hardware illustrated in FIG. 4. Furthermore, in another aspect, the device 400 may execute each configuration described with reference to FIG. 3 as a program on the hardware illustrated in FIG. 4. The device 400 includes a central processing unit (CPU) 1, a primary storage device 2, a secondary storage device 3, an external equipment interface 4, an input interface 5, an output interface 6, and a communication interface 7.

The CPU 1 can execute a program for realizing various functions of the device 400. The CPU 1 includes, for example, at least one integrated circuit. The integrated circuit may include, for example, at least one CPU, at least one field programmable gate array (FPGA), or a combination thereof.

The primary storage device 2 stores a program executed by the CPU 1 and data referred to by the CPU 1. In an aspect, the primary storage device 2 may be implemented by a dynamic random access memory (DRAM), a static random access memory (SRAM), or the like.

The secondary storage device 3 is a non-volatile memory, and may store a program executed by the CPU 1 and data referred to by the CPU 1. In this case, the CPU 1 executes the program read from the secondary storage device 3 to the primary storage device 2, and refers to data read from the secondary storage device 3 to the primary storage device 2. In an aspect, the secondary storage device 3 may be implemented by a hard disk drive (HDD), a solid state drive (SSD), an erasable programmable read only memory (EPROM), an electrically erasable programmable read only memory (EEPROM), a flash memory, or the like.

The external equipment interface 4 can be connected to any external equipment such as a printer, a scanner, and an external HDD. In an aspect, the external equipment interface 4 may be implemented by a Universal Serial Bus (USB) terminal or the like.

The input interface 5 may be connected to any input device such as a keyboard, a mouse, a touchpad, or a game pad. In an aspect, the input interface 5 may be implemented by a USB terminal, a PS/2 terminal, a Bluetooth (registered trademark) module, and the like.

The output interface 6 may be connected to any output device such as a cathode ray tube display, a liquid crystal display, or an organic electro-luminescence (EL) display. In an aspect, the output interface 6 may be implemented by a USB terminal, a D-sub terminal, a digital visual interface (DVI) terminal, a high-definition multimedia interface (HDMI) (registered trademark) terminal, or the like.

The communication interface 7 is connected to a wired or wireless network device. In an aspect, the communication interface 7 may be implemented by a wired LAN port, a wireless fidelity (Wi-Fi (registered trademark)) module, and the like. In another aspect, the communication interface 7 may transmit and receive data using a communication protocol such as a transmission control protocol (TCP)/IP or a user datagram protocol (UDP).

Figure 5:
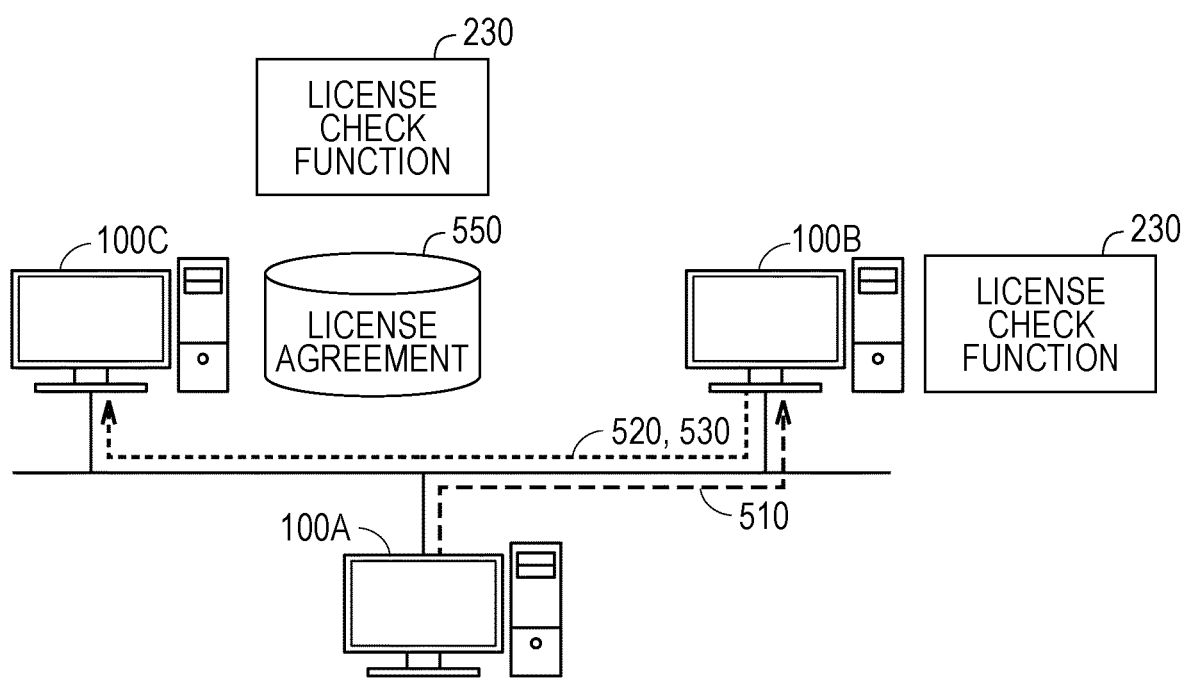
FIG. 5 is a diagram illustrating an example of a procedure of detecting a license violation related to remote access using an external server.

FIG. 5 is a diagram illustrating an example of a procedure of detecting a license violation related to remote access using an external server. In the example shown in FIG. 5, device 100A has transmitted, to device 100B, a request for remote access 510 to the software 120A. In an aspect, the devices 100A, 100B, and 100C may be the device 110A, 110B, and 110C, respectively, which is office equipment.

As a first example of using an external server, the license check unit 230 installed in the device 100B may refer to a license agreement 550 stored in the device 100C that is an external server. In this case, the device 100B transmits a request 520 for the license agreement from device 100C based on reception of a request for remote access 510 to the software 120A from device 100A. In addition, the device 100B determines whether there is a license violation based on the license agreement, of the software 120A, received from the device 100C. The license check unit 230 can determine whether there is a license violation according to the procedure described with reference to FIG. 2 in addition to requesting the license agreement from the device 100C.

As a second example of using an external server, the device 100C may store the license agreement 550 and include the license check unit 230. In this case, the device 100B transmits, to the device 100C, a request for a determination of a license violation 530 based on reception of a request for remote access to the software 120A from the device 100A. The license check unit 230 in the device 100C analyzes the license agreement of the software 120A and determines whether there is a license violation. Then, the license check unit 230 in the device 100C transmits the determination result to the device 100B. The license check unit 230 can determine whether there is a license violation according to the procedure described with reference to FIG. 2 in addition to operating on the device 100C.

As described above, since the device 100C (external server) collectively manages the license agreement 550, it is easy to modify the license agreement. In addition, since the device 100C includes the license check unit 230 that determines whether there is a license violation, the device in which the software is installed is only required to have an inquiry function to the device 100C.

C. Procedure for Detecting License Violation

Figure 6:
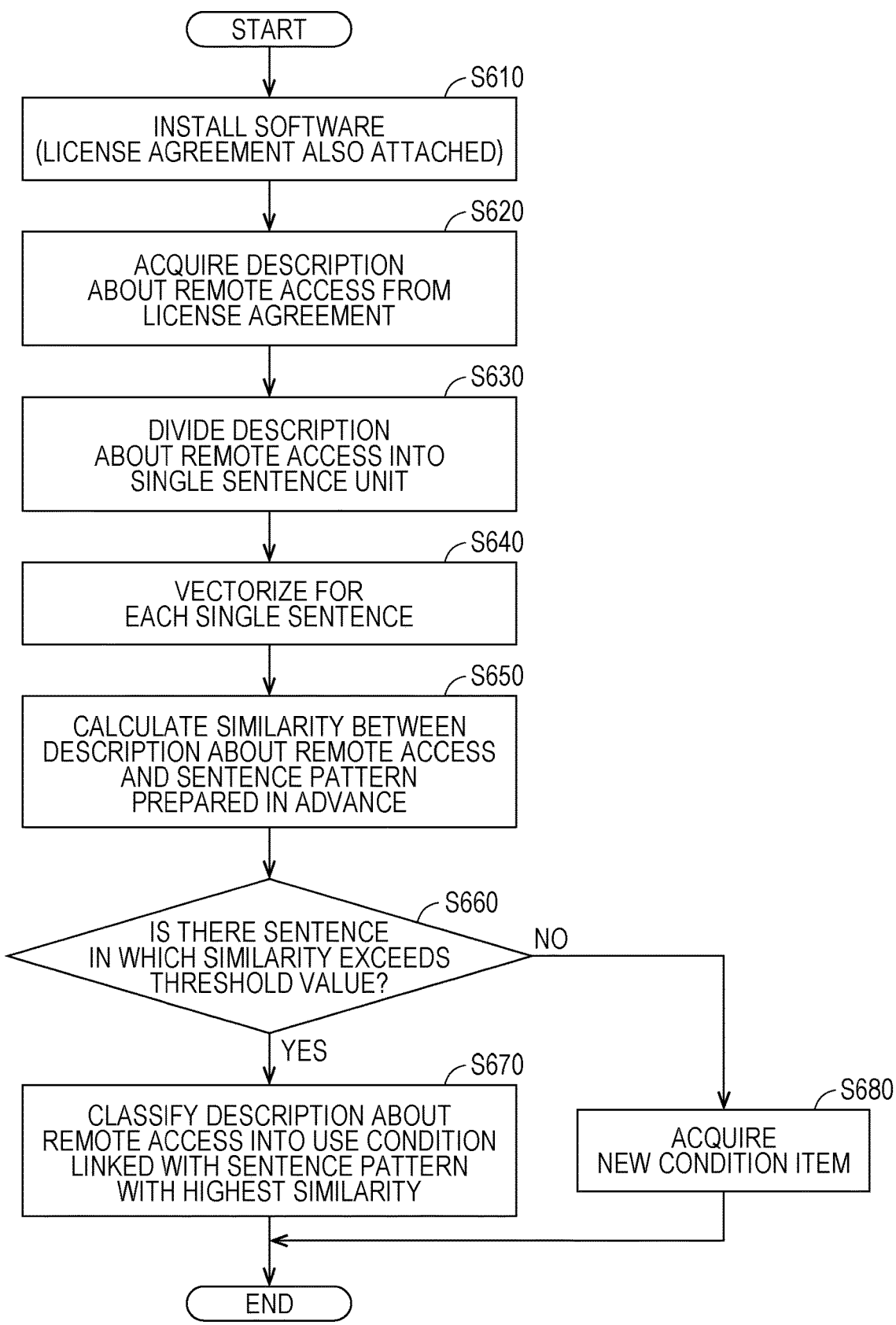
FIG. 6 is a diagram illustrating an example of a procedure for detecting a license violation in the device.

FIG. 6 is a diagram illustrating an example of a procedure for detecting a license violation in the device 400. In an aspect, the CPU 1 may read a program for executing the process of FIG. 6 from the secondary storage device 3 into the primary storage device 2 and execute the program. In another aspect, part or all of the processing can be realized as a combination of circuit elements that are configured to execute the processing.

In step S610, the CPU 1 installs software. In an aspect, the CPU 1 may install software from a storage medium via the external equipment interface 4. In another aspect, the CPU 1 may download and install software via the communication interface 7. The CPU 1 stores the terms of use of the software together with the installation of the software in the secondary storage device 3. The software corresponds to software 250 illustrated in FIG. 2.

In step S620, the CPU 1 acquires a description about remote access from the license agreement acquired in step S610. The CPU 1 may execute the processing in step S620 in response to the reception of the request for remote access as a trigger.

In step S630, the CPU 1 divides the description about remote access into units of a single sentence. In an aspect, the CPU 1 may divide the description about remote access into units of a single sentence using an algorithm of the morphological analysis or the like. In another aspect, the CPU 1 may use a dictionary for a specific word stored in the secondary storage device 3 in order to improve the accuracy of sentence division.

In step S640, the CPU 1 obtains the vector value (distributed representation) of the single sentence divided in step S630. In step S650, the CPU 1 calculates the similarity between the description about the remote access acquired in step S620 and the sentence pattern prepared in advance. In an aspect, the CPU 1 can calculate the similarity by comparing the vector value of the single sentence divided in step S630 with the vector value of the single sentence of the sentence pattern prepared in advance. In another aspect, the secondary storage device 3 may store a plurality of sentence patterns prepared in advance. In this case, the CPU 1 can refer to a sentence pattern prepared in advance from the secondary storage device 3.

In step S660, the CPU 1 determines whether there is a sentence having a similarity exceeding a threshold value with respect to the description about remote access acquired in step S620 in the predetermined sentence pattern. When determining that there is a sentence having a similarity exceeding the threshold value with respect to the description about remote access acquired in step S620 in the predetermined sentence pattern (YES in step S660), the CPU 1 advances the control to step S670. Otherwise (NO in step S660), the CPU 1 advances the control to step S680.

In step S670, the CPU 1 classifies the description about the remote access into the use condition linked with the sentence pattern having the highest similarity. The use condition corresponds to the use condition regarding remote access described with reference to FIG. 2. As an example, the use condition may include any use conditions such as "remote access permitted", "remote access not permitted", "simultaneous connection not permitted", "up to N devices are permitted to be connected simultaneously", and "available only in the same site". The CPU 1 can detect a license violation related to remote access based on the use condition and the criterion for determining the license violation linked with the use condition.

In step S680, the CPU 1 acquires a new use condition. In an aspect, the CPU 1 may output a notification prompting an administrator of the device 100 or the device 110 in which the license check unit 230 is installed to input a new use condition. The notification may be output to the display of the device 100 or of the device 110, may be transmitted to an email address, or may be transmitted to the administrator by any other means. The CPU 1 can update the sentence pattern of the license terms of remote access and the use condition regarding the remote access based on the reception of the sentence pattern corresponding to a new use condition and the use condition. In another aspect, the license check unit 230 may include a use condition acquisition unit (not illustrated) that acquires a sentence pattern corresponding to a new use condition and the use condition. In another aspect, the notification unit 330 may output the notification in step S680.

FIG. 7 is a diagram illustrating an example of process of describing part of the description of the license agreement in a single sentence. The CPU 1 can convert a description 710 about remote access of the license agreement into a set of single sentences 720 or a set of morphemes 730 by using an algorithm of a syntax analysis or a morphological analysis. When converting the description 710 about remote access of the license agreement into the set of single sentences 720 or the set of morphemes 730, the CPU 1 may use a dictionary including any words such as a product name and a personal name in order to improve conversion accuracy. The CPU 1 obtains a vector value from the set of single sentences 720 or the set of morphemes 730.

FIG. 8 is a diagram illustrating an example of link information 800 between a sentence pattern of license terms of remote access and a use condition regarding remote access. The secondary storage device 3 stores the link information 800 between a sentence pattern 810 of license terms of remote access and a use condition 820 related to remote access as illustrated in FIG. 8.

One use condition 820 may be linked with a plurality of sentence patterns 810. In the example illustrated in FIG. 8, the use condition "remote access permitted" is linked with the sentence patterns, "remote access is permitted", "software is available by remote access", and "software is also available by remote connection".

FIG. 9 is a diagram illustrating an example of process of calculating similarity between a description about remote access and a sentence pattern prepared in advance. As illustrated in FIG. 9, the secondary storage device 3 may store a vector value 930 of each sentence pattern 810 in advance. As an example, the CPU 1 extracts a description 950 about remote access from the license agreement of the software 120A based on reception of a request for remote access to the software 120A. Then, the CPU 1 converts the description 950 about remote access into a set of single sentences or a set of morphemes, and calculates a vector value of the set. Next, the CPU 1 compares the vector value of the description 950 about remote access with the vector value 930 of the sentence pattern 810 to calculate similarity. Further, the CPU 1 selects the use condition 820 linked with the sentence pattern 810 having the highest similarity to the description 950 about remote access.

Figures 10, 11:
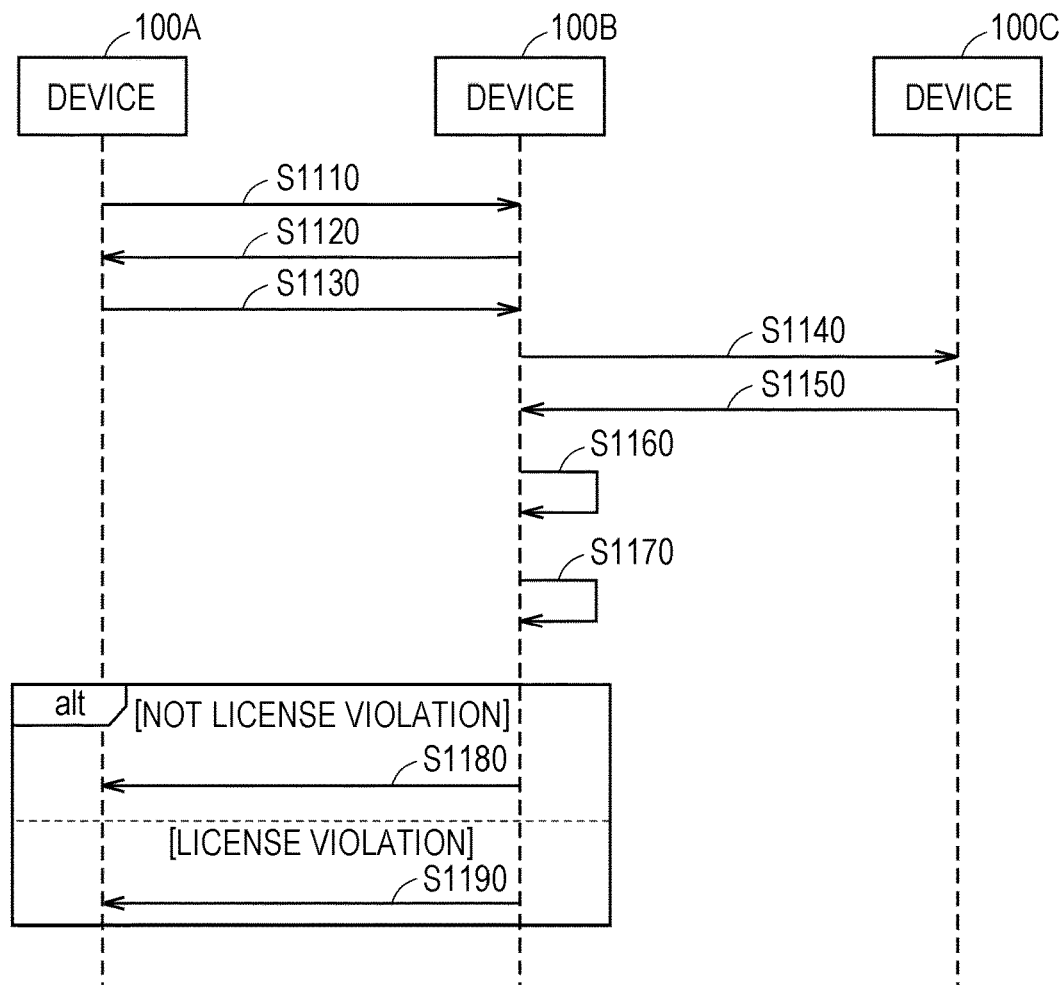
FIG. 10 is a diagram illustrating an example of the link information between a use condition related to remote access and a criterion for determining a license violation.
FIG. 11 is a diagram illustrating an example of the procedure for detecting a license violation according to an embodiment.

FIG. 10 is a diagram illustrating an example of link information 1000 between the use condition 820 related to remote access and a criterion for determining a license violation 1010. The secondary storage device 3 stores the link information 1000 between the use condition 820 related to remote access as illustrated in FIG. 9 and the criterion for determining a license violation 1010.

As an example, the criterion for determining a license violation 1010 includes items such as "None", "RemoteAccess", "NumConnection", and "Device.InstallationLocation". In an aspect, these items may be used as variables or the like in the program of the license check unit 230.

"None" indicates no condition. When the use condition 820 is "remote access permitted", no license violation related to remote access may occur. Therefore, the criterion for determining a license violation 1010 corresponding to the use condition 820, "remote access permitted", is "None".

"RemoteAccess" is a flag indicating the presence or absence of remote access. When the use condition 820 is "remote access not permitted", the CPU 1 can detect the presence or absence of a license violation related to remote access by checking the presence or absence of remote access. For example, in a case of "RemoteAccess=True (with remote access)", the CPU 1 can detect a license violation related to remote access.

"NumConnection" indicates the number of simultaneous remote access connections. When the use condition 820 is "simultaneous connection not permitted", the CPU 1 can detect the presence or absence of a license violation related to remote access by checking the presence or absence of remote access and the number of simultaneous connections. For example, in a case of "RemoteAccess=True (with remote access)" and "NumConnection>1", the CPU 1 can detect a license violation related to remote access.

"Device.InstallationLocation" indicates a location of the device. When the use condition 820 is "available from the same site (remote access permitted only from a specific region such as a region in the same LAN)", the CPU 1 can detect the presence or absence of a license violation related to remote access by checking the location of the device 100A that has transmitted the request for remote access and the location of the device 100B that has received the request for remote access. For example, in a case where "DeviceA.InstallationLocation≠DeviceB.InstallationLocation (different location between the device A and the device B)", the CPU 1 may detect a license violation related to remote access.

FIG. 11 is a diagram illustrating an example of the procedure for detecting a license violation according to the present embodiment. The sequence illustrated in FIG. 11 corresponds to the configuration of FIG. 5. The device 100A uses software installed in the device 100B by remote access. The device 100B is a device in which software is installed. The device 100C is an external server, and provides the device 100B with data or a function of verifying a license violation.

In step S1110, the device 100A transmits a request for remote access to the software 120A to the device 100B. In an aspect, the device 100B may complete the authentication process of the device 100A or the user of the device 100A before the process of step S1110. In step S1120, the device 100B returns an acknowledgement (ACK) for the request for remote access to the device 100A.

In step S1130, the device 100A transmits, to the device B, a software execution request. In an aspect, the software execution request may be included in the request for remote access.

In step S1140, the device 100B makes a request of the device 100C (external server) for information necessary for verification of presence or absence of a license violation related to remote access. The necessary information includes a software license agreement. In an aspect, the necessary information may further include some or all of a sentence pattern of license terms of remote access, a use condition regarding remote access, and a criterion for determining a license violation. In step S1150, the device 100C transmits, to the device 100B, information necessary for verifying the presence or absence of a license violation related to remote access.

In step S1160, the device 100B compares the license agreement of the software 120A with the sentence pattern of the license terms of remote access. Furthermore, the device 100B selects a use condition (remote access permitted, remote access not permitted, simultaneous connection not permitted, etc.) regarding remote access to the software 120A based on the comparison result.

In step S1170, the device 100B determines whether the remote access to the software 120A from the device 100A is a license violation based on the use condition regarding the remote access to the software 120A and the criterion for determining the license violation.

In step S1180, the device 100B transmits, to the device 100A, a notification of permitted remote access based on determining that the remote access to the software 120A from the device 100A is not a license violation.

In step S1190, the device 100B transmits, to the device 100A, a notification of rejected remote access based on determining that the remote access to the software 120A from the device 100A is a license violation. In an aspect, the notification may include data for displaying a screen or a message indicating that the user of the device 100A has breached the license. In another aspect, the device 100B may generate a communication log between the device 100A and the device 100B based on a license violation. Furthermore, in another aspect, the device 100B may block communication between the devices 100A and 100B after transmitting the notification.

In an aspect, instead of the process of steps S1140 to S1170, the device 100B may transmit, to the device 100C, a request for determining whether the remote access to the software 120A from the device 100A is a license violation.

In this case, the device 100C executes processing corresponding to steps S1160 and S1170. In addition, the device 100C transmits the determination result of the license violation to the device 100B.

Figure 12:
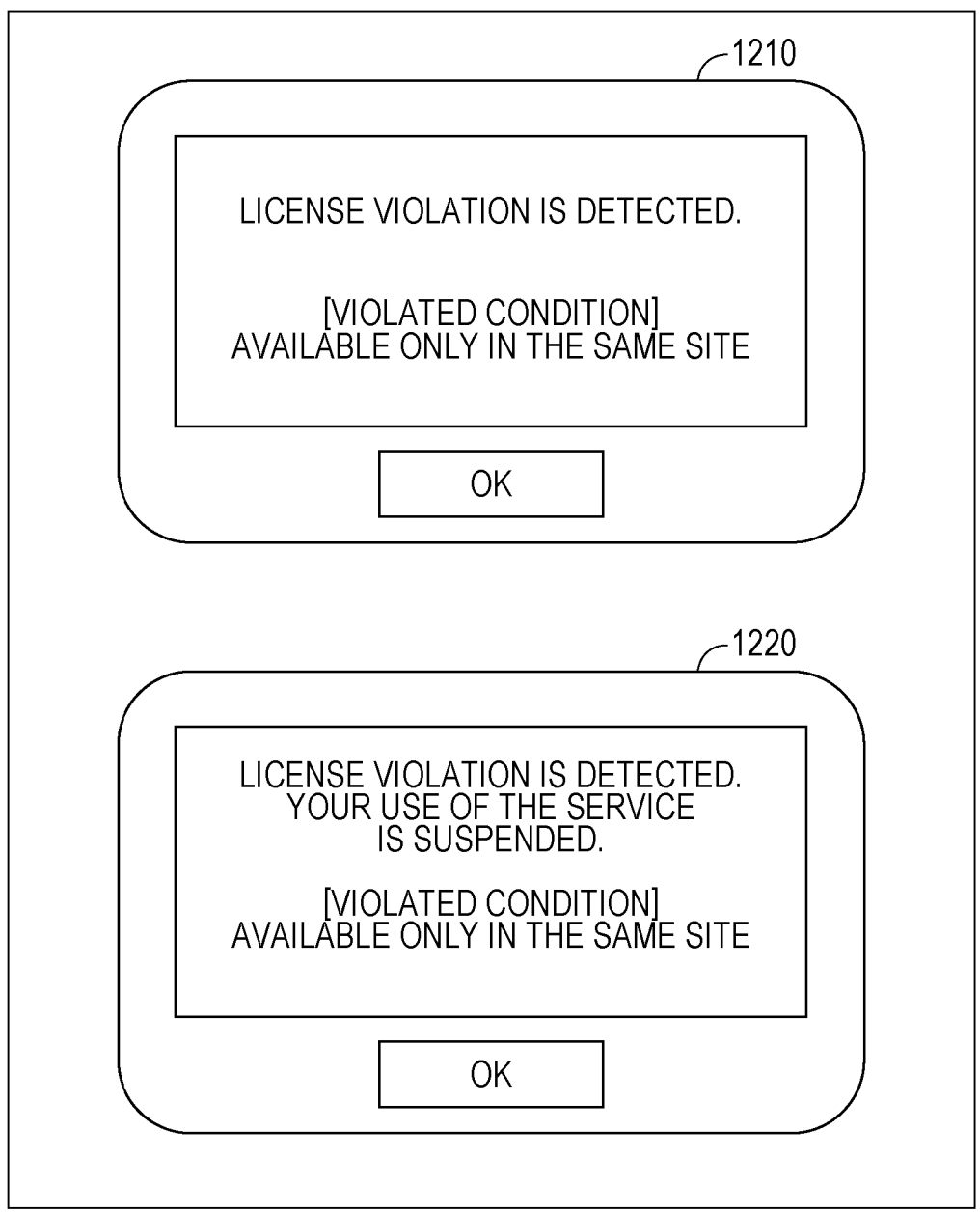
FIG. 12 is a diagram illustrating an example of a notification screen according to an embodiment.

FIG. 12 is a diagram illustrating an example of a notification screen according to the present embodiment. The device 400 in which the license check unit 230 is installed can transmit a notification including data for displaying a screen 1210, a screen 1220, or the like to the device that has transmitted the request for remote access. The notification can be transmitted, for example, at the timing of step S1190 illustrated in FIG. 11. In an aspect, device 400 may transmit, to the device that transmitted the request for remote access, information, for informing that there was any license violation, including a text message, an image, a video, or a combination thereof, rather than a screen.

As described above, the technology for detecting the presence or absence of a license violation related to remote access according to the present embodiment can determine the use condition of the software by analyzing the license agreement of the software, and determine the presence or absence of a license violation based on the use condition. In addition, by providing a single license check unit independently of the software which is to be remotely accessed, the presence or absence of the license violation of one or a plurality of software can be verified by a single license check unit. In this way, the vendor does not need to implement a license violation detection function related to remote access for each software.

It should be considered that the embodiment disclosed herein is an example in all respects and is not restrictive. The scope of the present disclosure is defined not by the above description but by the claims, and is intended to include all modifications within the meaning and scope equivalent to the claims. In addition, the disclosed contents described in the exemplary embodiment and the modifications are intended to be implemented alone or in combination as far as it is possible.

Although embodiments of the present invention have been described and illustrated in detail, the disclosed embodiments are made for purposes of illustration and example only and not limitation. The scope of the present invention should be interpreted by terms of the appended claims.

What is claimed is:
1. An information processing device comprising:
a hardware processor that executes a license check of software, wherein
the hardware processor
detects a request for remote access to the software,
extracts a description about remote access from a license agreement of the software to which a request for remote access is requesting access, and
determines, based on the extracted description about the remote access, whether the remote access is a license violation, wherein
the determining, based on the extracted description about the remote access, whether the remote access is a license violation includes
dividing the description about the remote access into single sentences to vectorize the divided description,
calculating similarities between the description about the remote access and sentence patterns of license terms, based on a vector value, the license terms being different from the license agreement of the software to which the request for remote access, determines one of the sentence patterns having the highest similarity, and determining, based on the one of the sentence patterns having the highest similarity, whether the remote access is a license violation.

2. The information processing device according to claim 1, wherein the hardware processor acquires, from a memory in the information processing device or another device, the license agreement of the software to which the request for remote access is requesting access.

3. The information processing device according to claim 2, wherein
the memory further stores the sentence pattern related to the request for remote access.

4. The information processing device according to claim 3, wherein
the memory further stores
use conditions regarding the remote access, and
a criterion for determining a license violation for each of the use conditions, and
the determining, based on a result of the calculation, whether the remote access is a license violation includes
classifying the description about the remote access into any one of the use conditions, and
determining, based on a classification result and the determination criterion, whether the remote access is a license violation.

5. The information processing device according to claim 4, wherein the classifying the description about the remote access into any one of the use conditions includes classifying, based on each of a plurality of use conditions of the software and a sentence pattern linked with each of the plurality of use conditions, which of the use conditions the description about the remote access corresponds to.

6. The information processing device according to claim 4, wherein the determination criterion includes a flag indicating presence or absence of the remote access, the number of remote accesses, and information about a location of each of the information processing device and a device that has transmitted the request for remote access.

7. The information processing device according to claim 6, wherein the determining, based on the classification result and the determination criterion, whether the remote access is a license violation includes acquiring, from the device that has transmitted the request for remote access, information about the device that has transmitted the request for remote access.

8. The information processing device according to claim 1, wherein the hardware processor transmits, based on a determination result that the remote access is a license violation, a warning to the device that has transmitted the request for remote access.

9. The information processing device according to claim 1, wherein the hardware processor blocks the remote access to the software based on a determination result that the remote access is a license violation.

10. The information processing device according to claim 1, wherein the hardware processor generates a log based on determining that the remote access is a license violation.

11. A system comprising:
a first device in which software is installed; and
a second device that stores a license agreement of the software,
wherein the first device
receives a request for remote access to the software, and
transmits, to the second device, a request for a determination of a license violation, based on reception of the request for remote access, and
wherein the second device
extracts, based on the determination request, a description about remote access from the license agreement of the software to which the request for remote access is requesting access,
determines, based on the extracted description about the remote access, whether the remote access is a license violation, and
transmits a result of the determination to the first device, wherein
the determining, based on the extracted description about the remote access, whether the remote access is a license violation includes
dividing the description about the remote access into single sentences to vectorize the divided description,
calculating similarities between the description about the remote access and sentence patterns of license terms, based on a vector value, the license terms being different from the license agreement of the software to which the request for remote access
determining one of the sentence patterns having the highest similarity, and
determining, based on the one of the sentence patterns having the highest similarity, whether the remote access is a license violation.

12. A method for checking a license of software, the method comprising:
detecting a request for remote access to the software;
extracting a description about remote access from a license agreement of the software to which the request for remote access is requesting access; and
determining, based on the extracted description about the remote access, whether the remote access is a license violation, wherein
the determining, based on the extracted description about the remote access, whether the remote access is a license violation includes
dividing the description about the remote access into single sentences to vectorize the divided description,
calculating similarities between the description about the remote access and sentence patterns of license terms, based on a vector value, the license terms being different from the license agreement of the software to which the request for the remote access,
determining one of the sentence patterns having the highest similarity, and
determining, based on the one of the sentence patterns having the highest similarity, whether the remote access is a license violation.

13. The method according to claim 12, further comprising acquiring, from a device that has received a request for remote access or another device, the license agreement of the software to which the request for remote access is requesting access.

14. The method according to claim 13, further comprising accessing a sentence pattern related to the request for remote access.

15. The method according to claim 14, wherein
the determining, based on a result of the calculation, whether the remote access is a license violation includes
accessing use conditions regarding the remote access and a criterion for determining a license violation for each of the use conditions, classifying the description about the remote access into any one of the use conditions, and determining, based on a classification result and the determination criterion, whether the remote access is a license violation.

16. The method according to claim 15, wherein the classifying the description about the remote access into any one of the use conditions includes classifying, based on each of a plurality of use conditions of the software and a sentence pattern linked with each of the plurality of use conditions, which of the use conditions the description about the remote access corresponds to.

17. The method according to claim 15, wherein the determination criterion includes a flag indicating presence or absence of the remote access, the number of remote accesses, and information about a location of each of a device that has received the request for remote access and a device that has transmitted the request for remote access.

18. The method according to claim 17, wherein the determining, based on the classification result and the determination criterion, whether the remote access is a license violation includes acquiring, from the device that has transmitted the request for remote access, information about the device that has transmitted the request for remote access.

19. The method according to claim 12, further comprising: transmitting, based on a determination result that the remote access is a license violation, a warning to the device that has transmitted the request for remote access.

20. The method according to claim 12, further comprising: generating a log based on determining that the remote access is a license violation.

* * * * *